United States Patent Office 2,782,449
Patented Feb. 26, 1957

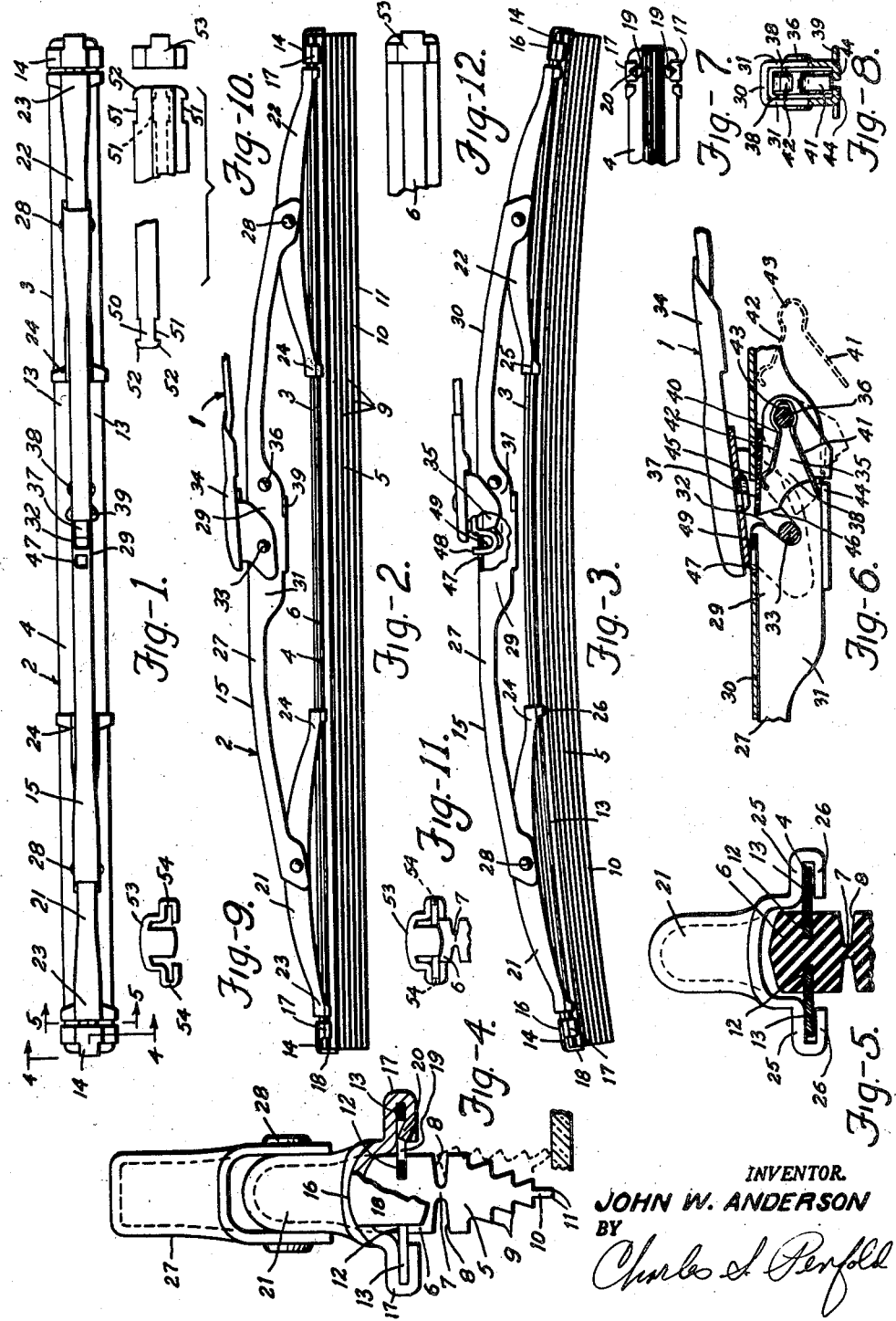

2,782,449

WINDSHIELD WIPER BLADE AND CARRIAGE ASSEMBLIES

John W. Anderson, Gary, Ind., assignor to Productive Inventions, Inc., a corporation of Indiana Original application August 7, 1947, Serial No. 766,956. Divided and this application September 27, 1956, Serial No. 612,542

17 Claims. (Cl. 15—245)

This invention relates generally to windshield or window cleaners or wiper devices and more particularly is directed to a device adapted to clean or wipe a curved surface as well as a substantially plane surface, and is related to a similar device shown in the copending applications of John W. Anderson, Serial No. 634,729 filed December 13, 1945, for Windshield Cleaner, and Serial No. 634,730 filed December 13, 1945, for Windshield Wiper Blade Linkage Assembly, the latter having issued on May 6, 1952 as Patent No. 2,596,063.

This application is a division of my application, Serial No. 766,956, filed August 7, 1947.

The primary object of the present invention is to provide a cleaning device in the class above mentioned which embodies improved principles of design and construction facilitating replacement of the resilient wiping element when it becomes worn or damaged.

A further object of the invention is to provide a construction and arrangement of parts which will permit without the use of tools, the ready replacement of the resilient wiping element embodied therein, in order that a minimum of time may be required for such replacements, which replacements are made usually on busy drives of gasoline service stations under conditions where the car owner and the station attendant each are desirous of shortening the time required for the service operation.

A further object of the invention is to provide a design and arrangement of parts which will facilitate the manufacture of the parts and will facilitate their assembly, in the manufacture of the complete assembly, in the manufacture of subassemblies thereof, and in the manufacture of replacement or refill assemblies as will be hereinafter described.

A further object of the invention is to provide a construction and arrangement of parts which will permit the employment of the reactive force of a portion of the resilient wiping element, after being subjected to compression for the purpose, in the locking in connection therewith of a clip serving to hold the parts of said assembly in correct operative relationship. By so employing such reactive force, the necessity for separate springs or other resilient members is avoided, the manufacture and use of the invention are facilitated, and its cost of manufacture is reduced.

A further object of the invention is to provide slideable connections of maximum width and stability between coactive assemblies of the invention.

Other objects and advantages of the invention will become evident after considering the description hereinafter set forth in conjunction with the drawings annexed hereto.

In the drawings:

Figure 1 is a top view of the complete assembly;

Figure 2 is a side view in elevation of the assembly illustrated in Figure 1, including a particular type of wiper arm, with the parts thereof shown in their relative positions when the assembly is applied to a windshield having a substantially planar surface;

Figure 3 is a side view in elevation of the assembly illustrated in Figure 1, including a different type of wiper arm, with the parts thereof shown in their relative positions when the assembly is applied to a windshield having a curved surface;

Figure 4 is a partial section taken substantially on line 4—4 of Figure 1;

Figure 5 is a section taken substantially on line 5—5 of Figure 1;

Figure 6 is a view illustrating the assembled connection between a part of the complete assembly and a wiper arm, portions of which are in section for the purpose of clearly illustrating the locking means;

Figure 7 is a section of one end of the assembly as viewed from the underside;

Figure 8 is a transverse section taken at an appropriate location through Figure 6;

Figures 9 through 12 exemplify a preferred construction of the invention, Figure 9 being an end view of the preferred fastening means;

Figure 10 is a view illustrating parts of such preferred construction;

Figure 11 is an end view of such parts assembled; and

Figure 12 is a top view of a section of such assembly.

Referring to Figure 2 of the drawing, numeral 1 designates the outer extremity of a conventional wiper arm supporting a complete wiper blade assembly generally designated 2 in a manner to press the wiper means or wiping element 3 either against a substantially planar surface or a curved surface to be cleaned. The element 3 is secured to spring like holder means or support 4, both constituting a blade unit constructed to normally assume a straight condition as exemplified in Figure 2.

More specifically, the element 3 is constructed of some desirable resilient material such as rubber and preferably includes a wiper head portion 5, generally triangular in cross-section, and an attaching portion 6, generally rectangular in cross-section, which portions are pivotally joined together by a reduced or neck portion 7. Stated otherwise, the sides of the element are interrupted by a pair of oppositely disposed longitudinally extending corresponding recesses or grooves 8 to provide pivotally connected parts or portions. The reduced portion 7 permits the wiper head 5 to yield or pivot with respect to the portion 6 adjacent the beginning of each stroke of the wiping means as it travels back and forth over the windshield glass.

The triangular wiper head 5 is provided with a plurality of wiping edges or arrises 9 and a lip 10, the latter having wiping edges 11, which are adapted to alternately engage the glass. Certain of the auxiliary wiping edges 9 may also be caused to engage and clean the glass, depending upon the pressure applied to the wiper arm and the resistance of extraneous matter encountered on the glass. It is to be understood that the wiping portion as well as the attaching portion of the wiper blade unit may be constructed otherwise than illustrated. For example, the wiping head may be entirely eliminated, in which event the neck portion 7 would be of a desirable size and provided with wiping edges corresponding to the edges 11 whereby to accomplish the result comprehended by the invention. Furthermore, the blade unit or assembly may be comprised of a plurality of plies or laminations of rubber or the equivalent, and if desired these may be bonded or otherwise secured to a holder or backing, whether substantially rigid or flexible in character.

The wiper element 3 and support 4 are preferably connected together by an interlocking arrangement. As clearly illustrated, the marginal side walls of the attaching portion 6 of the element are interrupted by a pair of oppositely disposed longitudinally extending corresponding grooves or recesses 12 which receive a pair of corresponding flexible members or strips 13 constituting the support for the resilient wiping element. These strips are preferably constructed of relatively thin metal strip stock, but may be made from any material suitable for the purpose. In certain applications of the invention, it may be considered advantageous to construct the holder or support in one piece. The wiper element and holder may be assembled as desired but the preferred method is to insert the strips 13 into the grooves 12, the reduced portion or neck resulting from the grooves being disposed between such strips. The strip portions 13 may then be permanently secured together in spaced apart parallel relation by a pair of corresponding fastening means 14 preferably disposed adjacent the extremities of the wiper unit, such securement being effected subsequent to attaching a carriage or linkage assembly 15 to such unit.

The fastening means 14 are substantially identical in character and accordingly, a description of one is deemed sufficient. Each preferably includes a rounded top wall portion 16 which overlies the upper surface of the attaching portion 6 of the wiping element, offset U-shaped formations or ears 17 provided adjacent one extremity of the wall 16 for receiving the strips 13, and a transverse stop portion 18 adjacent the opposite extremity of said wall which may be engaged by the end margins of the strips and wiping element whereby to prevent relative longitudinal movement therebetween. The U-shaped formations or ears 17 extend in opposite directions and are adapted to be clamped down against the strips as clearly illustrated in Figures 4 and 7. More specifically in this respect, the extremity of each strip is preferably provided with a circular opening 19 so that a portion 20 of each formation or ear may be pressed into such opening for locking against accidental separation. It is to be understood that other fastening means suitable for this purpose may be employed and that they may be secured to the holder or support in ways different from the one just described, the preferred construction being illustrated in Figures 9 through 12, which will be described subsequently. The fastening means 14 is so constructed as to permit its removal by applying to it in a direction lengthwise of the strip force in excess of the resistance necessary normally to prevent displacement.

The carriage or linkage assembly 15 above referred to serves to support the wiper unit and distribute the desired pressures thereagainst in accordance with the objects of the invention. This assembly 15 includes a pair of elongated secondary yokes or links 21 and 22, substantially identical in design and construction, which are associated with the wiper unit. More particularly in this respect, the outer end 23 of the link 21 is preferably connected adjacent to one extremity of the support 4 for the resilient wiping element and its inner end 24 is similarly slidably connected to the support at a point spaced longitudinally inwardly from the first point of connection. The ends of the other link 22 are also similarly connected to the support. The ends of the yokes or links are of a size and shape to receive the upper portion of the wiping element with sufficient clearances to prevent binding whenever the wiper unit slides with respect to the links during a wiping operation. The link ends include offset U-shaped ears comprised of bearing portions 25 and 26 which slidably engage the strips 13, the fit therebetween being relatively loose to provide a free action, yet sufficiently firm to impart stability to the assembly. More particularly in this respect, it will be noted that links 21 and 22 are provided adjacent their ends with cross portions having at their ends offset U-shaped ears which engage the outer lateral extremities of strips 13. Thus is provided maximum distance between opposite points of engagement, which distance effects a maximum of stability of the wiper blade assembly against torsion and effects a minimum of friction between said ears and said strips. This reduction of friction and torsional cramping is of great importance in providing freedom of flexibility necessary for effective performance under varying conditions. The opposite extremities of elongated bridge means or primary yoke 27 are preferably pivotally connected to intermediate portions of the links by means of pivots 28 which extend through the parts. The secondary yokes and primary yoke may be termed a triple yoke pressure distributing assembly. The bridge means is provided with connection means 29 whereby the wiper unit may be detachably connected to the free ends of different types or models of wiper arms. The connection means 29 will be described more in detail subsequently.

The connection means 29, above referred to, is unique in character and, among other things, includes a base wall 30 and widened side walls 31 of the bridge means, which walls are preferably notched to provide an opening 32 for the reception of an entering part in the form of a cross pivot 33, carried by a fitting 34, attached to the outer extremity of the wiper arm 1, as exemplified in Figures 1 and 6. A spring latch 35 is housed substantially within the confines of the walls just referred to and is pivoted at 36 and serves to obstruct the opening 32 for the purpose of detachably holding the complete wiper assembly to the arm. The latch may be constructed as desired but is preferably of channel shape and includes a base strike portion 37, side walls 38, and finger portions 39 extending outwardly from the side walls for manual engagement.

The spring 40 of the latch is generally U-shaped in character and includes a pair of legs 41 and 42 joined together by a bight or loop portion 43. The spring 40 prior to being assembled with the latch, normally assumes an expanded position as illustrated by the dotted lines in Figure 6. After the latch has been secured in place by pivot 36, the spring is contracted and inserted into the latch to the illustrated full line position so that the leg 41 bears against the inturned portions 44 of the side walls 31 of the bridge means, and the leg 42 engages the base strike portion 37 of the latch to normally urge and maintain such portion against the base wall 30 of the bridge to block the opening 32.

Attention is directed to the fact that the bight portion 43 of the spring is of such a size that the same snaps into holding relation with the pivot 36 and due to the fact that the legs of the spring are normally maintained in a contracted state or condition, the bight portion is firmly held in the desired position for influencing the operation of the latch. It will also be noted that the end of the leg 42 is preferably curved as indicated at 45 so as to assist in passing the leg 42 into the space between the pivot 36 and strike portion 37 as well as reduce the friction when the strike portion of the latch slidably engages the curved portion 45. Attention is also directed to the fact that the inner marginal edges 46 of the side walls 38 of the latch are positioned at an angle with reference to the strike portion so that if for any reason the wiper assembly and arm tend to become separated, the cross pivot 33 will engage the margins 46 and since the strike portion is backed against the base wall of the bridge, there is no chance for such parts to be disconnected.

To assemble the entering or cross pivot 33 with the connection means, the entering part is pressed against the strike portion of the latch which yields and then snaps back into the full line position illustrated when the entering part is seated in the opening. To disconnect the parts it is merely necessary to manually engage the finger portions 39 to pivot the latch so that the strike portion will clear the opening 32, whereupon the entering part may be removed.

As clearly exemplified in Figures 1, 3 and 6, the base wall 30 of the connection means is also provided with an aperture 47 closely related to the opening 32 so that hook-like entering part 48 carried by an arm may be inserted into the opening 32 and aperture 47 whereby the hook will receive the portion 49 separating such opening and aperture. The connection means 29, in effect, is of a universal character in that it provides means whereby arms carrying entering parts of different characters may support the complete wiper assembly. It is important to note that the connection means is so constructed and arranged that it does not increase the overall width of the complete wiper assembly, thereby minimizing its obstruction to vision.

The embodiment of the invention illustrated in Figures 9 through 12 will now be considered. This embodiment of the invention is of major importance in that provision is made whereby the wiper unit comprised of a resilient wiping element and a holder may be more readily detachably connected to the carriage or linkage assembly 15, thereby presenting an arrangement whereby when the wiper blade unit becomes worn or damaged, the same may be easily removed and a new one assembled within the linkage assembly. More specifically in this respect, and as clearly illustrated in Figure 10, the opposite end of each flexible strip comprising the holder or support is provided with a portion 50 of a width less than the width of the strip. The narrow portion 50 is formed by providing the longitudinal marginal edges of each strip with a substantially rectangular notch 51, which notches are located inwardly from the ends of the strips. The corners of the strips are preferably rounded as indicated at 52. The flexible strips of this embodiment are adapted to be inserted into the grooves or recesses provided in the attaching portion of the resilient wiping element as illustrated in Figures 10, 11 and 12 and in accordance with the first embodiment. A pair of fastening means 53, identical in character and corresponding substantially to the fastening means 14, are adapted to be forced over the ends of the wiper blade unit so that the junction walls 54 provided on the ears will be received in the notches 51 and the remaining portions of the ears will embrace portion 50 whereby to hold the strips, resilient wiping element, and the links assembled.

The rounded corners 52 provided adjacent the ends of the strips assist in piloting the fastening means over such ends. The parts are preferably so constructed and arranged that when the fastening means are forced upon the strips, the latter will be directed toward each other to compress that portion of the wiping element between such strips, thereby offering reactive resilience to cause the fastening means to snap into position when the walls 54 thereof are received in the notches 51. In other words, a portion of the resilient wiping element must be compressed in the process of applying fastening means 53, and reacts when such means reaches its operative position with relation to notches 51 so that means 53 engages said notches to detachably hold the fastening means securely against accidental displacement until detached by manual pressure directing the strips toward each other with sufficient force to again compress the wiping element to permit ready removal of such means.

Attention is further directed to the fact that when the fastening means 53 are secured in place, portions of the wiping element are in a position to recede or expand into those notches 51 which face the attaching portion of such element whereby to reduce the amount of such manual pressure required. Also, it should be noted that since the strips comprising the holder are identical in character they may be easily and quickly assembled with the wiping element, without selectively positioning such parts for assembly, this factor being of considerable importance from the standpoint of speeding up assembly operations and reducing assembly costs.

The fastening means 14 and 53 above referred to may be termed "holding means," "clips," "locking members," "abutment means," "stop means" and "fittings."

Other forms of fastening means, locking means or abutment means are disclosed in my copending applications Serial Numbers 573,012 and 404,279; and in the copending applications of Fred A. Krohm, Serial Numbers 297,098; 334,147 and 341,051.

Accordingly, it will be apparent that unique means have been provided whereby when the original wiper unit becomes worn or damaged, it may be easily removed and replaced by a new unit, this effecting an appreciable saving to the car owner and a conservation of labor and material.

Having thus described my invention, it is obvious that various modifications may be made in the same without departing from the spirit of the invention; and, therefore, I do not wish to be understood as limiting myself to the exact forms, constructions, arrangements, and combinations of parts herein shown and described.

I claim:

1. A windshield cleaner comprising a flexible squeegee unit conformable to a surface to be wiped, a pressure distributing device having relatively movable parts engaged with the squeegee unit for distributing arm applied pressure to said unit, said device comprising bridge means and yokes pivotally mounted on the opposite extremities of the bridge means, the ends of the yokes being longitudinally movable on the squeegee unit, and detachable means adjacent the extremities of the unit for limiting the extent of such longitudinal movement.

2. In a windshield wiper assembly, an elongated wiper blade freely flexible in a single plane, pressure distributing means having longitudinally spaced portions engaging said blade for longitudinal sliding movement, and abutment means on said blade limiting sliding movement of said portions therealong, said abutment means being removable whereby to permit complete separation of said blade from said pressure distributing means.

3. In a windshield wiper assembly, an elongated wiper blade including a wiping member and flexible support means therefor, said support means having laterally projecting edge portions, pressure distributing means having longitudinally spaced contact portions, means engaging said laterally projecting edge portions and guiding said longitudinally spaced contact portions for longitudinal sliding movement relative to said wiper blade, and holding means holding said wiping member in assembled relation to said pressure distributing means, said holding means being movable to permit separation of said wiper blade from said pressure distributing means.

4. In a windshield wiper assembly, an elongated wiper blade including a wiping member and flexible support means therefor, said support means being formed for movement in a plane substantially perpendicular to a surface to be wiped and having laterally projecting edge portions, pressure distributing means having longitudinally spaced portions connected to said laterally projecting edge portions and means holding said wiping member and support means in assembled relation, said holding means being movable to permit disassembly of said wiping member from said support means.

5. In a windshield wiper, a subassembly comprising an elongated flexible wiping element of resilient material and elongated support means supporting said flexible element, said support means having edges extending outwardly from the sides of the element, a multiple-yoke pressure distributing means having portions slidably embracing the edges of said support means, abutment means adjacent one extremity of the subassembly limiting longitudinal movement of the distributing means in one direction, and abutment means adjacent the other extremity of the subassembly for limiting movement of the sub assembly in an opposite direction, at least one of said abutment means being displaceable so that the subassembly may be separated from the distributing means for replacement purposes.

6. In a windshield wiper, a subassembly adapted to receive pressure from a pressure-distributing device, said subassembly comprising an elongated flexible wiping element of resilient material, elongated support means supporting said flexible element, said support means comprising opposed portions having a portion of said wiping element therebetween, a locking member adapted normally to interlockingly engage and engaging normally said opposed portions at an extremity thereof whereby the application of manual pressure directly upon said opposed portions of said support means to press them together against the resilience of said portion of the wiping element disengages the locking member from said opposed portions of said support means to permit the manual removal of said locking member to permit the ready slidable removal of the subassembly from a pressure-distributing device.

7. A windshield cleaner comprising an elongated wiper blade having a resilient wiping element and a support therefor, a pressure distributing unit slidably connected to the blade, stop means on the support for limiting movement of the distributing unit in one direction, abutment means provided on the support, and a detachable clip on the support cooperating with the abutment means for limiting movement of the unit in an opposite direction.

8. A windshield cleaner comprising a blade unit and a pressure distributing unit, said blade unit comprising a resilient wiper element and a pair of supporting members embracing said wiper element, spaced means carried by the ends of said supporting members, said pressure distributing unit extending longitudinally of the blade unit and slidably connected thereto between said spaced means, each of said spaced means having an offset engageable with an end of the wiper element for holding the element in place, and said supporting members and one of said spaced means being so constructed that such spaced means can be readily removed from the blade unit by pressing said supporting members toward each other and so that the element can be detached from the supporting members.

9. A windshield cleaner comprising a blade unit and a pressure distributing unit, said blade unit comprising a resilient wiper element and a support therefor, spaced means carried by said support, said pressure distributing unit extending longitudinally of the blade unit and slidably connected thereto at longitudinally spaced points between said spaced means, and one of said spaced means being detachably held in relation to the blade by the reactive resilience of the wiper element to permit removal of the element from the support.

10. A windshield cleaner comprising a flexible squeegee unit substantially uniformly flexible throughout its length and conformable to the surface being wiped, a slidable pressure distributing holder unit having relatively movable parts engaged with the squeegee unit for distributing an arm applied pressure to said squeegee unit, said holder comprising a pair of yokes movably mounted intermediate their ends on a pressure-applying means and having their opposite ends individually slidably connected to the squeegee unit only at points spaced longitudinally along the unit for conforming the latter to the surface being wiped, and easily detachable means connected to the squeegee unit for determining the extent of the relative sliding movement between the units and permitting separation of the units.

11. A windshield cleaner comprising a holder unit consisting of a primary yoke and plural secondary yokes movably connected thereto, a squeegee unit substantially uniformly and freely flexible throughout its length and connected only at longitudinally spaced points to the secondary yokes for longitudinal sliding movement with respect to the holder unit, and means detachably carried by one of said units for permitting separation of said units.

12. A wiper assembly for cleaning a surface comprising, a blade having an elongated flexible wiper, an elongated resiliently flexible backing member connected to said wiper and flexible in unison therewith in a single plane, said backing member being substantially more resistant to flexure than said wiper, spaced means carried by the blade, and pressure distributing means having at least three portions relatively movable in said plane and respectively slidably connected to said blade at points adjacent the ends thereof and at least one other point intermediate said ends, said pressure distributing means being longitudinally slidable on said blade between said spaced means and adapted to receive pressure from a single source and distribute said pressure to said at least three points, one of said spaced means being removable to permit separation of the distributing means from the blade.

13. A surface wiper comprising, a blade having an elongated linearly continuous resilient wiping member capable of flexure to conform to a surface to be wiped and having elongated backing means extending longitudinally of said resilient wiping member and cooperatively related to said member, said backing means being easily and substantially uniformly flexible in a single plane, pressure applying means having different portions slidably bearing upon said blade at longitudinally spaced points, and spaced means on the blade for limiting sliding movement between the blade and said portions, at least one of said spaced means being removable to permit separation of the blade from the pressure applying means.

14. A windshield wiper blade comprising an elongated resilient wiper element and elongated continuous resiliently flexible means supporting the element, said flexible means being flexible in a plane substantially perpendicular to a surface to be wiped and being substantially inflexible in a plane at right angles to said first mentioned plane, and fittings adjacent the extremities of the blade for holding the element and flexible means assembled, at least one of said fittings being removable to permit removal of the element from said flexible means.

15. A windshield wiper blade reversely flexible for conforming to a curved surface, a pressure device having portions connected to the blade at at least three longitudinally spaced locations, and means adjacent the extremities of the blade for holding the blade and device assembled, at least one of said means being readily removable to permit separation of the blade and device.

16. A windshield wiper blade comprising an elongated resilient wiper element and resiliently flexible means supporting the element for movement in a direction substantially perpendicular to a surface to be wiped, means for limiting longitudinal movement of the element in one direction with respect to the flexible means, and means carried by the flexible means for limiting longitudinal movement of the element in the opposite direction with respect to the flexible means, said last mentioned means being readily removable to permit separation of the element and flexible means.

17. A windshield wiper blade comprising an elongated resilient wiping element carried throughout substantially its entire length by a support readily flexible in a plane substantially perpendicular to the windshield and relatively inflexible in a plane transverse thereto, a pressure-distributing assembly engaging said blade at spaced-apart points thereon, said assembly comprising a plurality of relatively movable parts, abutment means carried by said blade, abutment means opposed thereto and carried by said pressure-distributing assembly, for maintaining said assembly and said blade in operative relationship, at least one of said abutment means being unlockably displaceable to permit the removal of said blade from said assembly.

References Cited in the file of this patent

UNITED STATES PATENTS

| | | |
|---|---|---|
| 1,283,175 | Heller | Oct. 29, 1918 |
| 2,116,877 | Brown | May 10, 1938 |
| 2,651,800 | Picon | Sept. 15, 1953 |